United States Patent

Hasegawa et al.

[11] Patent Number: 5,795,266
[45] Date of Patent: Aug. 18, 1998

[54] CONTROL DEVICE FOR LOCKUP CLUTCH

[75] Inventors: Koichi Hasegawa; Yoshinori Yamamoto; Toru Iwahashi, all of Wako, Japan

[73] Assignee: Honda Giken Kogyo Kabushiki Kaisha, Tokyo, Japan

[21] Appl. No.: 683,375

[22] Filed: Jul. 18, 1996

[30] Foreign Application Priority Data

Jul. 20, 1995 [JP] Japan .................. 7-184250

[51] Int. Cl.$^6$ ............................................. F16H 6/14
[52] U.S. Cl. .................. 477/169; 477/175; 477/176; 477/905
[58] Field of Search ................. 477/120, 166, 477/169, 174, 175, 905, 176

[56] References Cited

U.S. PATENT DOCUMENTS

| | | | |
|---|---|---|---|
| 4,577,737 | 3/1986 | Niikura et al. | 477/174 X |
| 4,872,540 | 10/1989 | Sekine et al. | 477/169 |
| 4,881,627 | 11/1989 | Ishii | 477/174 X |
| 5,086,889 | 2/1992 | Nobumoto et al. | 477/176 X |
| 5,133,232 | 7/1992 | Kikuchi et al. | 477/905 X |
| 5,157,608 | 10/1992 | Sankpal et al. | 477/155 X |
| 5,267,158 | 11/1993 | Sakaguchi et al. | 477/174 X |
| 5,662,552 | 9/1997 | Fukasawa et al. | 477/169 |

*Primary Examiner*—Khoi Q. Ta
*Attorney, Agent, or Firm*—Nikaido, Marmelstein, Murray & Oram LLP

[57] ABSTRACT

When the change rate $d\theta_{TH}$ of an accelerator opening degree exceeds a reference value at a time point $t_0$ as a result of the depression of an accelerator pedal, a predetermined target speed ratio eECONOMY taking preference of a specific fuel consumption up to such time is switched to a during-acceleration target speed ratio ePOWER taking preference of an accelerating performance. For a period from the time point $t_0$ to a time point $t_2$ until the actual speed ratio e reaches a minimum value, a feed-forward control is carried out in order to equalize the actual speed ratio e to the during-acceleration target speed ratio ePOWER. For a period from the time point $t_2$ to a time point $t_3$, a return-time target speed ratio eTRN gradually increased toward the predetermined target speed ratio eECONOMY is set, and a feed-back control is carried out in order to equalize the actual speed ratio e to the return-time target speed ratio eTRN. Thus, it is possible to set the speed ratio of a torque converter at a high value during a normal cruising of a vehicle to enhance the specific fuel consumption, and to reduce the speed ratio during depression of the accelerator pedal to enhance the accelerating performance.

8 Claims, 9 Drawing Sheets

During non-operation of transient control
In steady state (during slow acceleration)

$\Delta \theta_{TH}$ = small

During operation of transient control
During acceleration $\Delta \theta_{TH}$ = large

CONTROL DEVICE FOR LOCKUP CLUTCH

BACKGROUND OF THE INVENTION

1. Field of the Invention

The present invention relates to a control device for a lockup clutch for controlling the speed ratio of a torque converter of an automatic transmission in accordance with the operational state of a vehicle.

2. Description of the Related Art

Such a control device for a lockup clutch is known, for example, from Japanese Patent Application Laid-open No. 2-120564. In this control device for a lockup clutch, a torque amplifying effect of the torque converter is exhibited by releasing the engagement of the lock-up clutch during accelerating operation of an engine, thereby enhancing the accelerating performance of the vehicle.

The above known control device for a lockup clutch has a problem that the speed ratio of the torque converter is merely controlled in an ON/OFF manner in accordance with the throttle opening degree and hence, it is difficult to control, in detail, the speed ratio of the torque converter in accordance with the driver's accelerating operation and to provide a sufficient accelerating performance required by the driver.

SUMMARY OF THE INVENTION

Accordingly, it is an object of the present invention to provide a control device for a lockup clutch capable of appropriately controlling the speed ratio of the torque converter with a driver's accelerating requirement sufficiently reflected.

To achieve the above object, according to a first aspect and features of the present invention, there is provided a control device for a lockup clutch for controlling an engage force of a lock-up clutch such that the actual speed ratio of a torque converter of an automatic transmission becomes equal to a predetermined target speed ratio corresponding to an operational state of a vehicle, said control device for a lockup clutch comprising: an engine load change rate detecting means for detecting a change rate of an engine load; a maximum driving-force speed ratio calculating means for calculating a maximum driving-force speed ratio of the torque converter which provide a maximum driving force corresponding to the operational state of the vehicle; and a target speed ratio switching means for switching said predetermined target speed ratio to said maximum driving-force speed ratio when the change rate of the engine load becomes equal to or larger than a predetermined value.

With such arrangement, it is possible to reflect the driver's accelerating requirement, causing the torque converter to exhibit a maximum torque amplifying effect corresponding to the operational state of the vehicle, thereby enhancing the accelerating performance of the vehicle.

According to a second aspect and feature of the present invention, in addition to the first feature, the control device for a lockup clutch further includes a maximum driving-force speed ratio correcting means for correcting the maximum driving-force speed ratio, based on the change rate of engine load detected by said engine load change rate detecting means.

With the above arrangement, it is possible to further effectively reflect the driver's accelerating requirement to the accelerating performance of the vehicle.

According to a third aspect and feature of the present invention, there is provided a control device for a lockup clutch for controlling an engage force of a lock-up clutch such that the actual speed ratio of a torque converter of an automatic transmission becomes equal to a predetermined target speed ratio corresponding to an operational state of a vehicle, said control device for a lockup clutch comprising: an engine load change rate detecting means for detecting a change rate of an engine load; a target speed ratio switching means for switching said predetermined target speed ratio to a during-acceleration target speed ratio when the change rate of the engine load becomes equal to or larger than a predetermined value; and a switching-control releasing means for releasing the control for switching said predetermined target speed ratio to said during-acceleration target speed ratio, when the actual speed ratio becomes minimum value after said predetermined target speed ratio has been switched to said during-acceleration target speed ratio by the target speed ratio switching means.

With the above arrangement, it is possible to reflect the driver's accelerating requirement, causing the torque converter to exhibit a large torque amplifying effect corresponding to the operational state of the vehicle, thereby enhancing the accelerating performance of the vehicle. When the actual speed ratio reaches the minimum value as a result of the switching of the predetermined target speed ratio to the during-acceleration target speed ratio, the during-acceleration target speed ratio is returned again to the predetermined target speed ratio. Therefore, the control during acceleration can be automatically restored to the normal-time control.

According to a fourth aspect and feature of the present invention, in addition to the third feature, said switching-control releasing means is forcibly operated when said actual speed ratio does not reach said minimum value within a predetermined time after said predetermined target speed ratio has been switched to said during-acceleration target speed ratio by said target speed ratio switching means.

With the above arrangement, even if the actual speed ratio does not reach the minimum value within a predetermined time after the predetermined target speed ratio has been switched to the during-acceleration target speed ratio by the target speed ratio switching means, the control during acceleration can be restored to the normal-time control, if a predetermined time has been lapsed.

According to a fifth aspect and feature of the present invention, in addition to the third feature, a determination of whether said actual speed ratio reaches said minimum value after a lapse of a predetermined time is started after said predetermined target speed ratio has been switched to said during-acceleration target speed ratio by said target speed ratio switching means.

With the above feature of the present invention, it is possible to cause the torque converter to exhibit a large torque amplifying effect by sufficiently reducing the actual speed ratio based on the during-acceleration target speed ratio.

With a sixth aspect and feature of the present invention, in addition to the third feature, as a return-time target speed ratio to be used for a time period from the operation of said switching-control releasing means to a lapse of a predetermined time, a first return-time target speed ratio which is gradually increased from said during-acceleration target speed ratio to said predetermined target speed ratio in proportion to the lapse of time is used.

With the above feature of the present invention, the control during acceleration can be automatically and smoothly returned to the normal-time control.

According to a seventh aspect and feature of the present invention, as a return-time target speed ratio to be used for a time period from the operation of said switching-control releasing means, a second return-time target speed ratio calculated based on the engine load and the number of rotations of a main shaft is used.

With the above feature of the present invention, the control during acceleration can be automatically and smoothly returned to the normal-time control and moreover, the operation of an accelerator pedal by a driver can be reflected to the change in speed ratio.

According to an eighth aspect and feature of the present invention, in addition to the third feature, as a return-time target speed ratio to be used for a time period from the operation of said switching-control releasing means to a lapse of a predetermined time, larger one of a first return-time target speed ratio which is gradually increased from said during-acceleration target speed ratio to said predetermined target speed ratio in proportion to the lapse of time, and a second return-time target speed ratio calculated based on the engine load and the number of rotations of a main shaft is used.

With the above feature of the present invention, the control during acceleration can be automatically and smoothly returned to the normal-time control and moreover, the operation of an accelerator pedal by a driver can be reflected to the change in speed ratio.

The above and other objects, features and advantages of the invention will become apparent from the following description of a preferred embodiment taken in conjunction with the accompanying drawings.

DETAILED DESCRIPTION OF THE PREFERRED EMBODIMENTS

Figure 1:
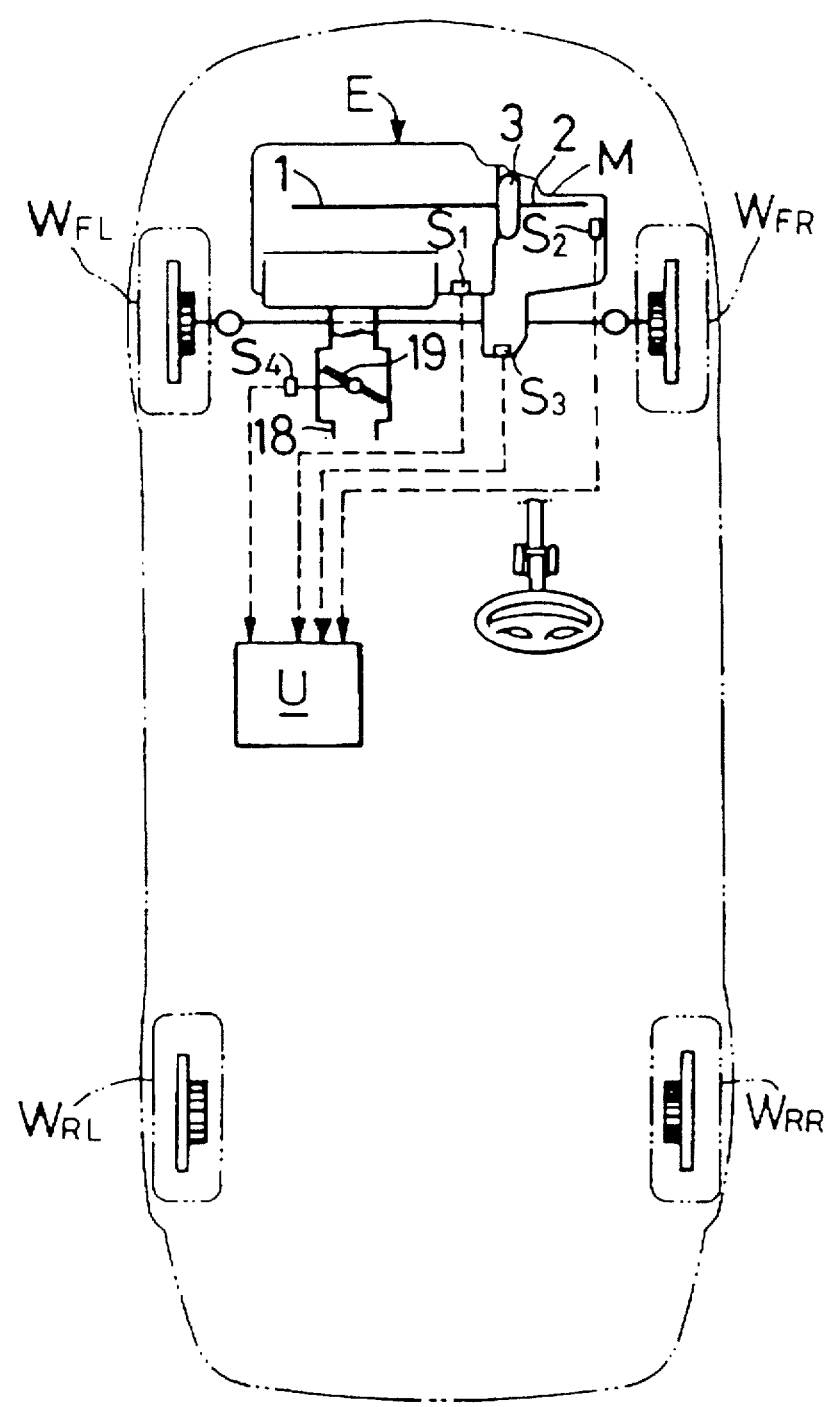
FIG. 1 is an diagrammatic illustration of the entire arrangement of a vehicle equipped with a control device for a lockup clutch according to an embodiment of the present invention.

Referring to FIG. 1, a vehicle is a front-wheel drive vehicle and includes a pair of left and right wheels $W_{FL}$ and $W_{FR}$ to which a torque of an engine E is transmitted through an automatic transmission M, and a pair of left and right follower wheels $W_{RL}$ and $W_{RR}$ rotated with traveling of the vehicle. A known torque converter 3 is interposed between a crankshaft 1 of the engine E and a main shaft 2 of the automatic transmission M. The torque converter 3 includes a lock-up clutch 4 operated by a hydraulic pressure, such that a speed ratio of the torque converter 3 is controlled by regulating the hydraulic pressure by a linear solenoid to vary the engage force of the lock-up clutch 4 (see FIG. 2).

An engine revolution-number detecting means $S_1$ for detecting a number Ne of rotations of the engine E is mounted in the engine E, and a main shaft rotation-number detecting means $S_2$ for detecting a number Nm of rotations of the main shaft 2 and a shift-position detecting means $S_3$ for detecting a shift position P are mounted in the automatic transmission M. A throttle opening degree detecting means $S_4$ for detecting a throttle opening degree $\theta_{TH}$ is mounted in a throttle valve 19 incorporated in an intake passage 18 in the engine E.

Figure 2:
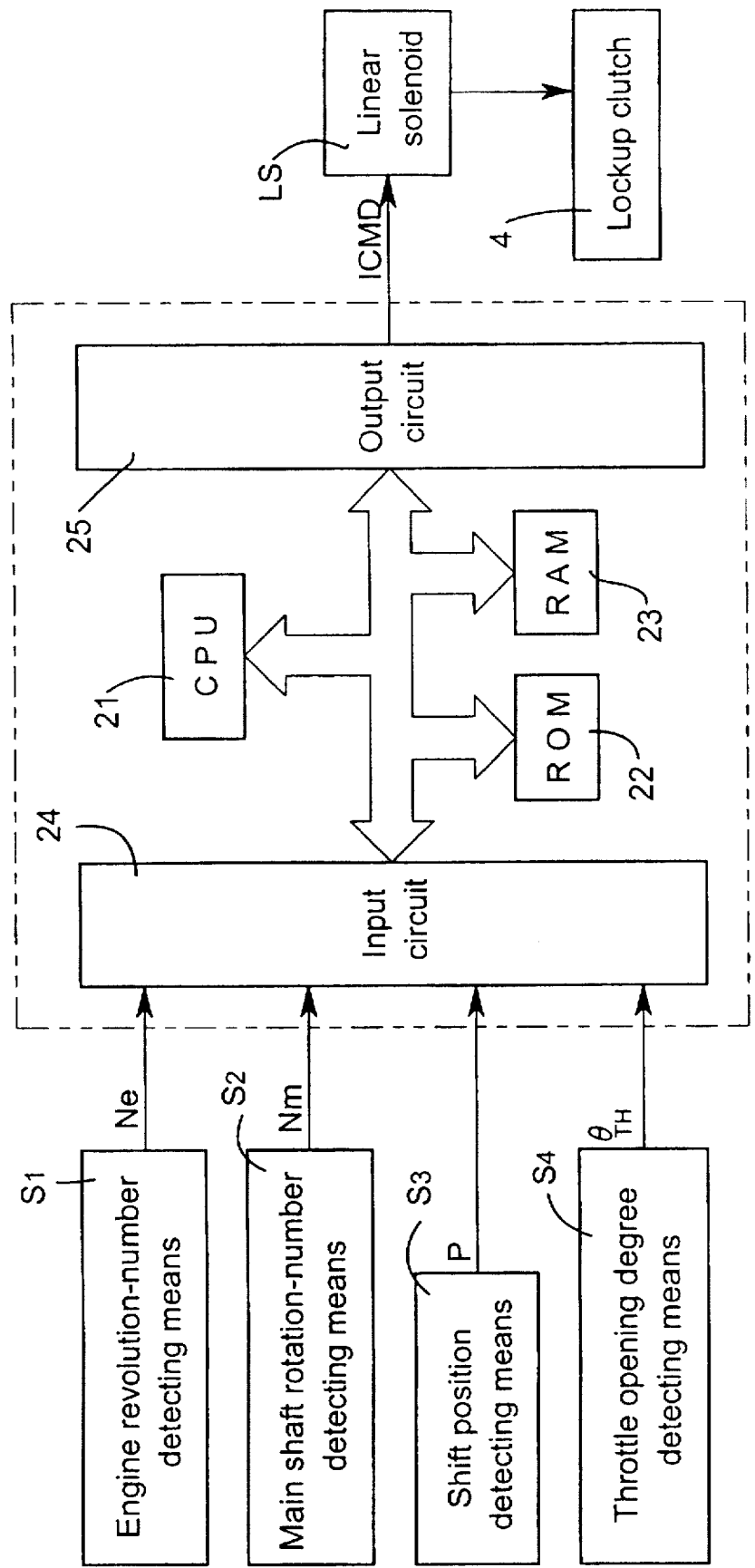
FIG. 2 is a block diagram of an electronic control unit.

FIG. 2 shows an electronic control unit U for calculating signals from the detecting means according to a control program and controlling the speed ratio of the torque converter 3 by driving the linear solenoid LS. The electronic control unit U includes a central processing unit (CPU) 21 for conducting the calculation, a read-only memory (ROM) 22 having data such as the control program, various tables and the like stored therein, a random-access memory (RAM) 23 for temporarily storing signals output from the detecting manes and calculation results, an input circuit 24 to which the detecting means, i.e., the engine-revolution-number detecting means $S_1$, the main shaft rotation-number detecting means $S_2$, the shift position detecting means $S_3$ and the throttle opening degree detecting means $S_4$ are connected, and an output circuit 25 to which the linear solenoid LS is connected.

Thus, the electronic control unit U calculates various signals input thereto through the input section 24 and data stored in the read-only memory 22 in the central processing unit 21 according to the control program (which will be described hereinafter), and finally controls the current value to be supplied to the linear solenoid LS through the output section 25. Thus, the engage force of the lock-up clutch 4 can be varied to control the speed ratio of the torque converter 3.

Figure 3:
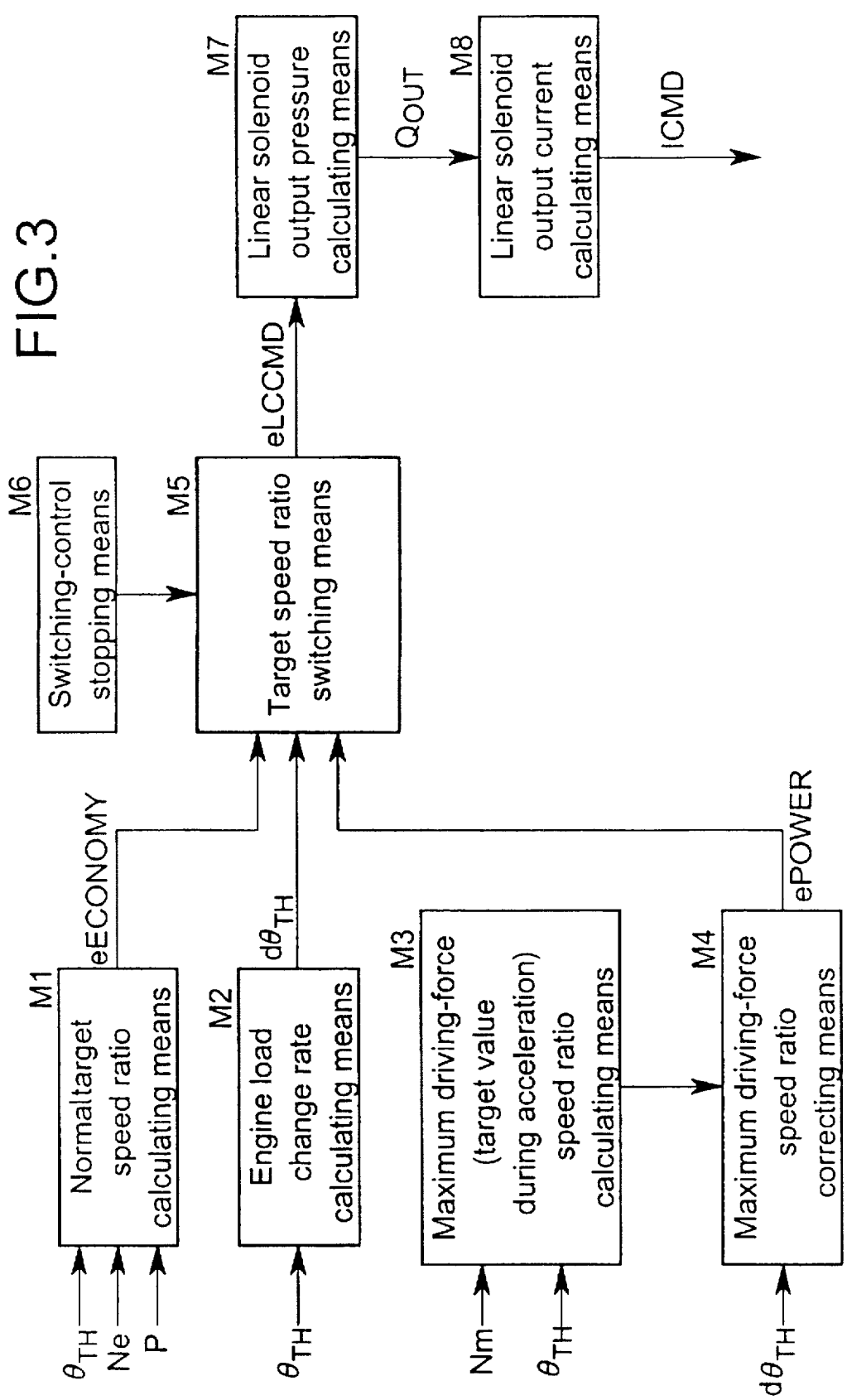
FIG. 3 is a block diagram illustrating a circuit arrangement of the control device for a lockup clutch.

FIG. 3 is a block diagram illustrating the circuit arrangement of a control device for a lockup clutch. The control device for a lockup clutch includes a normal target speed ratio calculating means M1, an engine load change-rate calculating means M2, a maximum driving-force (target value during acceleration) speed ratio calculating means M3, a maximum driving-force speed ratio correcting means M4, a target speed ratio switching means M5, a switching-control releasing means M6, a linear solenoid output pressure calculating means M7, and a linear solenoid output current calculating means M8.

Figure 4:
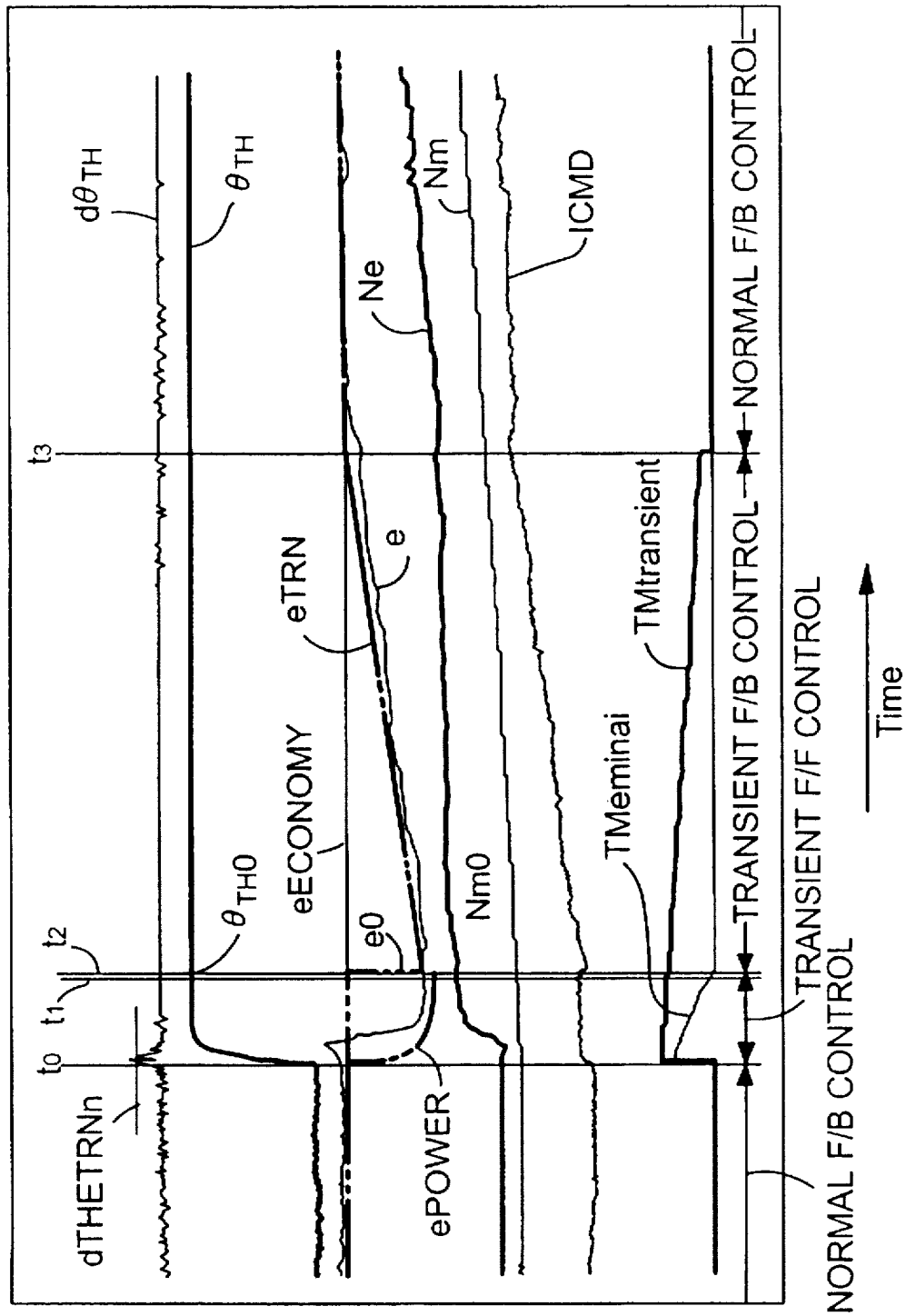
FIG. 4 is a time chart for explaining the operation of the embodiment of the present invention.

The operation of the embodiment of the present invention will be described with reference to mainly the block diagram in FIG. 3 and a time chart in FIG. 4.

First, the normal target speed ratio calculating means M1 calculates a normal-state target speed ratio eECONOMY of the torque converter 3 in a normal operational state of the vehicle (i.e., In an operational state excluding an abruptly accelerating state), based on parameters indicating the operational state of the vehicle; the engine revolution-number Ne detected by the engine revolution-number detecting means $S_1$; the shift position P detected by the shift position detecting means $S_3$; and the throttle opening degree $\theta_{TH}$ detected by the throttle opening degree detecting means $S_4$. The normal-state target speed ratio eECONOMY is given by a table-searching and predetermined as a value prevention of the generation of surging or a reflected sound of the torque converter 3, while enhancing mainly the specific fuel consumption. In the normal operational state of the vehicle, a feed-back control is carried out such that if the normal-state target speed ratio eECONOMY is defined as a target speed ratio eLCCMD, an actual speed ratio e is equal to the target speed ratio eLCCMD.

The engine load change-rate calculating means M2 calculates a change rate $d\theta_{TH}$ which is a time-differentiation value of the throttle opening degree $\theta_{TH}$ detected by the throttle opening degree detecting means $S_4$. If change rate $d\theta_{TH}$ of the throttle opening degree $\theta_{TH}$ is equal to or larger than a previously set predetermined value dTHETRNn, i.e., if a driver strongly depresses an accelerator pedal in order to suddenly accelerate the vehicle, a transient control is started to accelerate the vehicle by increasing the slip amount of the torque converter 3 to exhibit a torque amplifying effect.

More specifically, at a time point $t_0$, if the change-rate $d\theta_{TH}$ of the throttle opening degree $\theta_{TH}$ becomes equal to or larger than the predetermined value dTHETRNn, the target speed ratio switching means M5 switches over the normal-state target speed ratio eECONOMY to a maximum driving-force speed ratio ePOWER calculated in the maximum driving-force speed ratio calculating means M3. Also, at the time point $t_0$, three timers: a transient control limit timer TMtransient, an e0 detection delay timer TMeminai and an e0 detection limit timer TMe0LIMIT are set simultaneously.

Figure 5:
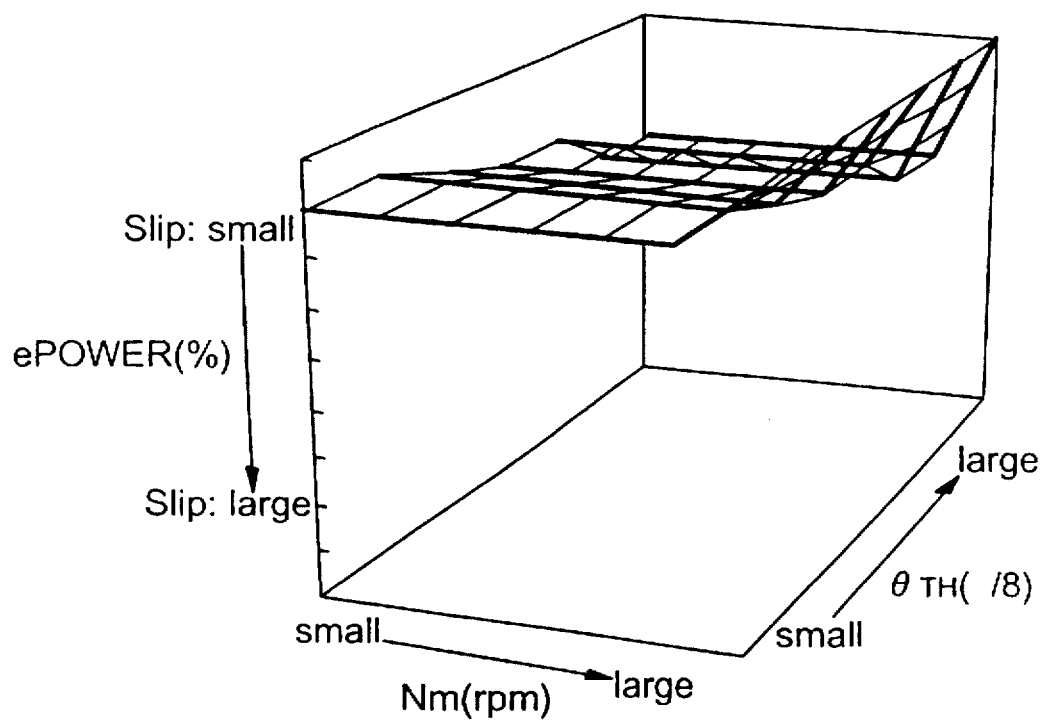
FIG. 5 is a table for searching a maximum driving-force speed ratio ePOWER.

The maximum driving-force speed ratio ePOWER is a speed ratio at which the driving force of the vehicle is maximum. The maximum driving-force speed ratio ePOWER is searched from a three-dimensional table shown in FIG. 5, based on the number of rotations of the main shaft detected by the main shaft rotation-number detecting means $S_2$ and the throttle opening degree $\theta_{TH}$ detected by the throttle opening degree detecting means $S_4$.

In general, if the speed ratio e of the torque converter 3 is decreased to increase the slip rate of the lock-up clutch 8, the torque amplifying effect of the torque converter 3 is exhibited to increase the driving force. But as shown in the table in FIG. 5, when the main shaft rotation-number Nm is high and the throttle opening degree $\theta_{TH}$ is large, a larger driving force may be provided in some cases, by setting the speed ratio e of the torque converter 3 at a larger value to decrease the slip rate of the lock-up clutch 8. This is because even if the engagement of the lock-up clutch 8 is released during traveling of the vehicle at a higher speed, the torque converter 3 is in a fluid-coupling state and hence, the torque amplifying effect cannot be provided. In this case, even if the throttle opening degree $\theta_{TH}$ is increased for providing a larger driving force, a fluid transmission loss (an energy loss) of the torque converter 3 may be increased in some cases. Therefore, in such a case, it may be preferable that the lock-up clutch 3 is completely coupled.

Taking the above-mentioned matters into consideration, a table for the maximum driving-force speed ratio ePOWER is established by tabulating or tabling the data based on the operational state of the vehicle. More specifically, taking it into consideration that the torque amplifying effect of the torque converter 3 depends upon the number of rotations and the torque amplifying effect cannot be expected at a number of rotations equal to or larger than the predetermined value, the number Nm of rotations of the main shaft is selected as a parameter for the table. And taking the output characteristic of the engine E and the like into consideration, a throttle opening degree $\theta_{TH}$ corresponding to the current driving force of the engine E is selected. In view of the fact that the torque of the engine E is divided into a fluid-transmission torque of the torque converter and a mechanical (frictional) transmission torque provided by the lock-up clutch 8, a maximum driving-force speed ratio ePOWER is determined such that the torque transmitted in accordance with the number Nm of rotations of the main shaft and the throttle opening degree becomes maximum.

Figure 6:
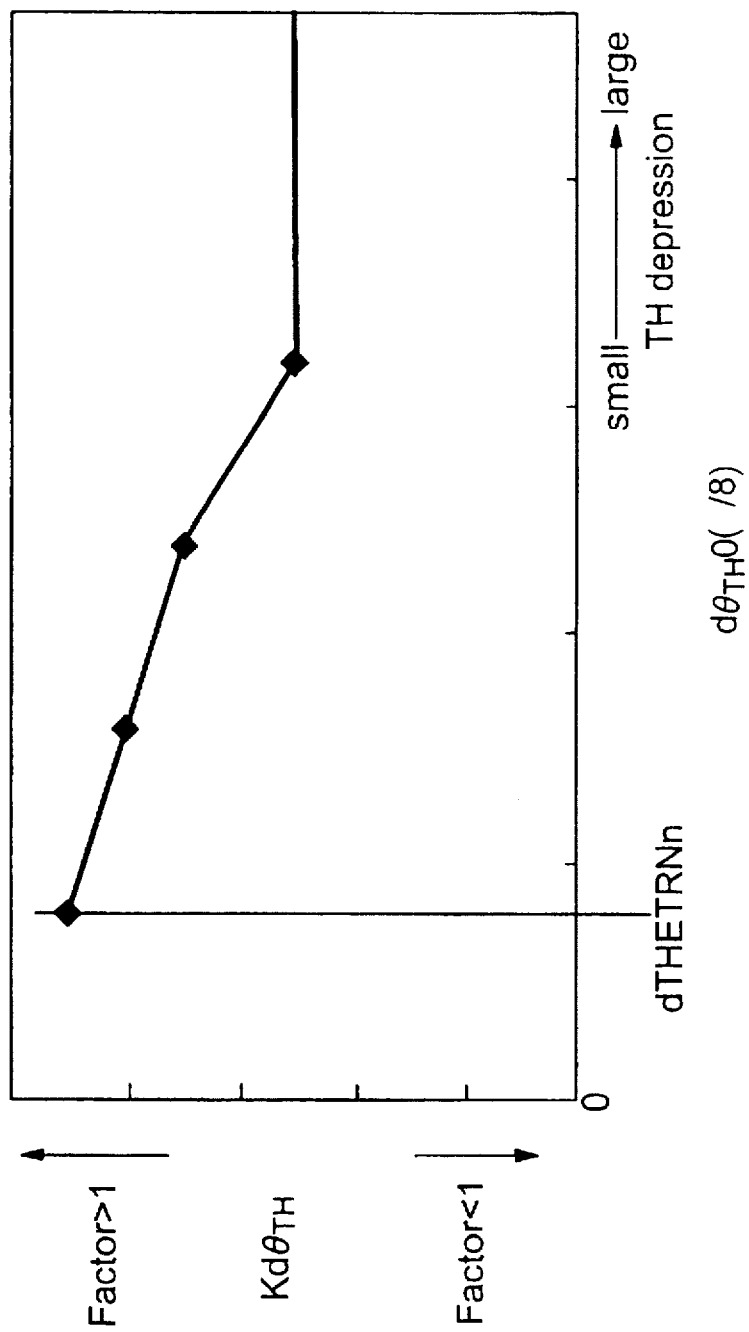
FIG. 6 is a table for searching a correcting factor $Kd\theta_{TH}$.

The maximum driving-force speed ratio ePOWER is corrected by the maximum driving-force speed ratio correcting means M4 before being input to the target speed ratio switching means M5. The maximum driving-force speed ratio correcting means M4 searches a correcting factor $Kd\theta_{TH}$ from a table shown in FIG. 6, based on the change rate $d\theta_{TH}$ of the throttle opening degree $\theta_{TH}$ at the start of the transient control at the time point $t_0$, and multiplies the maximum driving-force speed ratio ePOWER by this correcting factor $Kd\theta_{TH}$ to correct the maximum driving-force speed ratio ePOWER. As a result, the maximum driving-force speed ratio ePOWER is decreased (i.e., the slip amount of the torque converter 3 is increased) a smaller valve in response to the driver depressing the accelerator pedal quickly to demand a sudden acceleration and hence, a sufficient torque amplifying effect can be achieved to suddenly accelerate the vehicle.

By correcting the maximum driving-force speed ratio ePOWER based on the change rate $d\theta_{TH}$ of the throttle opening degree $\theta_{TH}$ at the start of the transient control in the above manner, an accelerating performance meeting the driver's accelerating requirement can be exhibited.

In an area where the maximum driving-force speed ratio ePOWER is selected as the target speed ratio eLCCMD in place of the normal-state target speed ratio eECONOMY, i.e., in a transient feed-forward area started from the time point $t_0$, the actual speed ratio e of the torque converter is feed-forward controlled with the maximum driving-force speed ratio ePOWER used as the target speed ratio eLCCMD through the lock-up clutch 4. During this time, the slip amount of the torque converter 3 is increased to exhibit the torque amplifying effect and hence, it is possible to achieve a sudden acceleration of the vehicle with a driver's intention reflected.

Figures 9A, 9B:
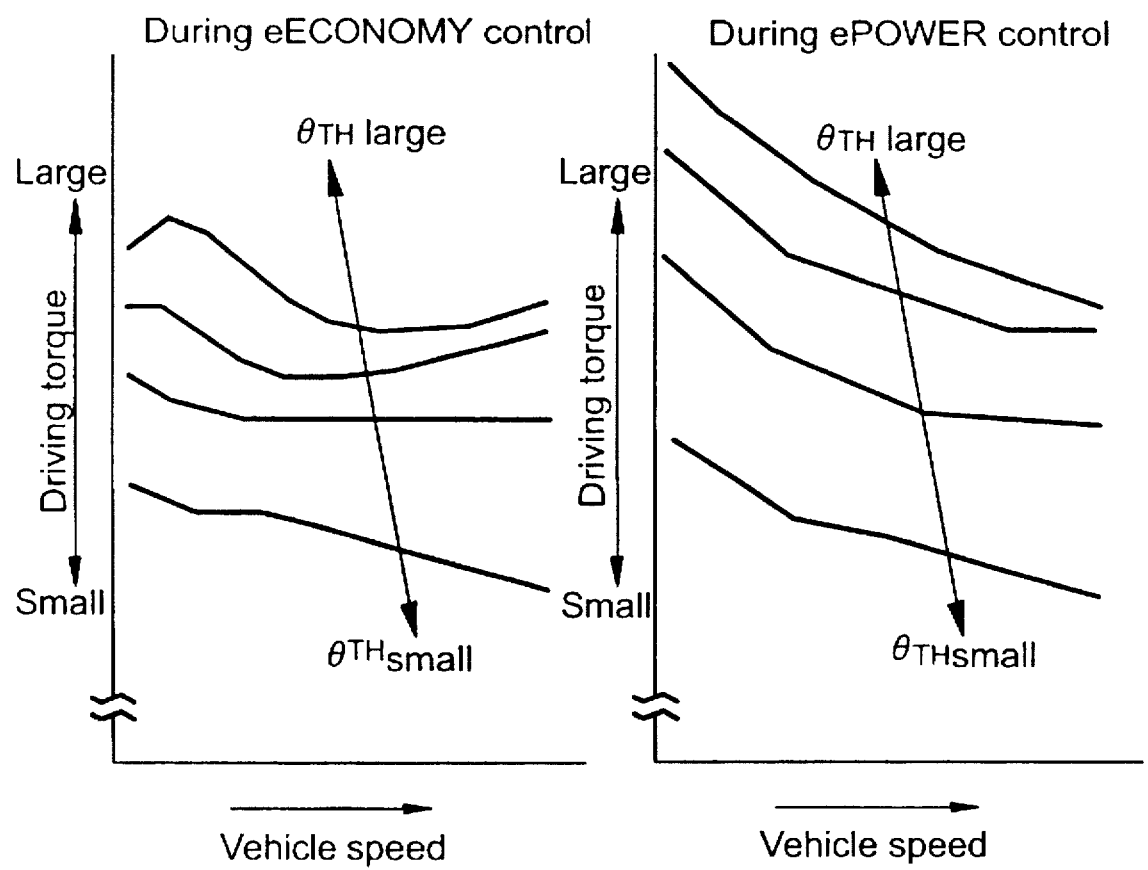
FIGS. 9A and 9B are graphs illustrating the driving torque at a normal time and during acceleration.

FIGS. 9A and 9B are graphs illustrating the comparison of the driving torque in a normal state in which the normal-state target speed ratio eECONOMY is selected, with the driving torque during acceleration in which the maximum driving-force speed ratio ePOWER is selected. It can be seen that the driving force during acceleration is larger than that in the normal state.

At a time point $t_1$, if the counting time by the e0 detecting delay timer TMeminai is completed, the detection of a minimum speed ratio e0 is started. If the actual speed ratio e is converted from the decrease to the increase within a period of from the time-up of the e0 detecting delay timer TMeminai to the time-up of the e0 detection limit timer TMe0LIMIT, the minimum speed ratio e0 is provided by an actual speed ratio e at that time. If the actual speed ratio e is continued to be decreased without being converted to the increase for a period of from the time point $t_1$ to the time-up of the e0 detecting limit timer TMe0LIMIT, the minimum speed ratio e0 is provided by an actual speed ratio e at the time when the time of the e0 detecting limit timer TMe0LIMIT is up.

The upper and lower limits of the minimum speed ratio e0 are controlled such that the following expression is satisfied:

$$eECONOMY > e0 > ePOWER \text{ - - -} \quad (1)$$

If $e0 \geq eECONOMY$, the transient control is forcibly finished. If $e0 \geq ePOWER$, the limiting process according to e0=POWER is carried out.

If the minimum speed ratio e0 is detected at a time point $t_2$, the target speed ratio eLCCMD is converted from the maximum driving-force speed ratio ePOWER to a return-time target speed ratio eTRN, and a transient feed-forward area is shifted to a transient feed-back area. At that time, the main shaft rotation-number Nm at this time is dealt as being Nm0, and the throttle opening degree $\theta_{TH}$ is dealt as being $\theta_{TH}0$. The releasing of the transient feed-forward control conducted by switching the target speed ratio eLCCMD from the normal target speed ratio eECONOMY to the maximum driving-force speed ratio ePOWER, i.e., the starting of the transient feed-back control at the time point $t_2$ is carried out by the switching control releasing means M6.

The transient feed-back area started from the time point $t_2$ is established by smoothly returning the actual speed ratio e decreased in the transient feed-forward area to the normal target speed ratio eECONOMY. The return-time target speed ratio eTRN is larger one of a first return-time target speed ratio eTRNr and a second return-time target speed ratio eTRNm. The upper and lower limits of the return-time target speed ratio eTRN are controlled such that the following expression is satisfied:

$$eECONOMY > eTRN > ePOWER \quad\quad (2)$$

The first return-time target speed ratio eTRNr is given by the following equation:

$$eTRNr = eTRNr + ddeTRN \quad\quad (3)$$

wherein ddeTRN is an addition value which is to be added to the first return-time target speed ratio eTRNr in every loop. The magnitude of ddeTRN is set such that the first return-time target speed ratio eTRNr becomes equal to the normal target speed ratio eECONOMY when the time of the transient control limit timer Tmtransient is up, if the addition of ddeTRN is started from the time point $t_2$ when the transient feed-back area is entered.

Figure 7:
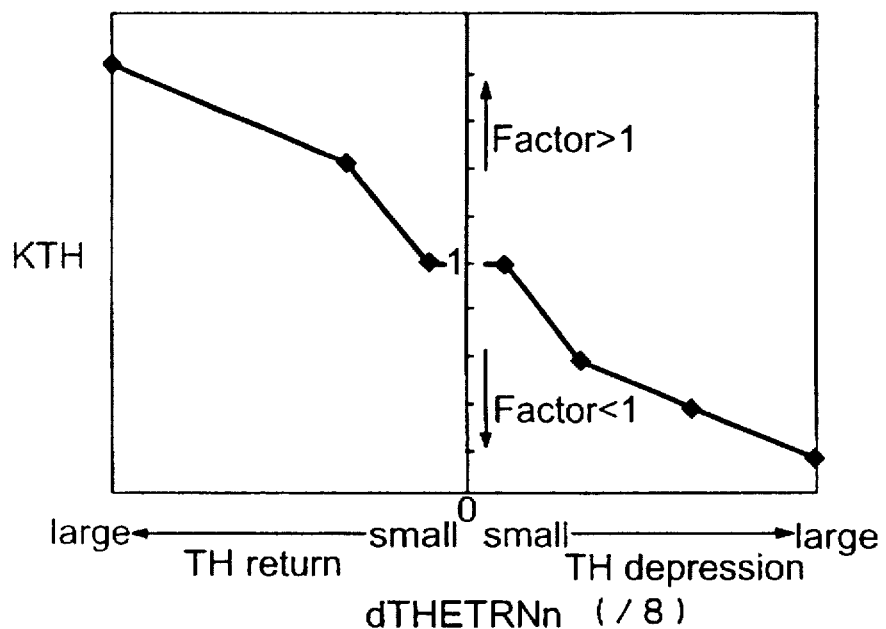
FIG. 7 is a table for searching a correcting factor KTH.

On the other hand, the second return-time target speed ratio eTRNm is given by the following equation:

$$eTRNm = eO \times KTH \times (Nm/Nm0) + KTH \times KTRNn \times (|Nm - Nm0|) \quad\quad (4)$$

wherein KTH is a correcting factor searched from a table shown in FIG. 7, based on an amount dTHTRN of change in throttle opening degree ($=\theta_{TH}-\theta_{TH}0$) (i.e., an amount of change in current throttle opening degree $\theta_{TH}$ with respect to the throttle opening degree $\theta_{TH}0$ at the time of entering into the transient feed-back area), and KTRNn is an addition factor to increase the eTRN.

A first term, eO*KTH*(Nm/Nm0) in a right side of the equation (4) is a basic term for increasing the return-time target speed ratio eTRN with an increase in the main shaft rotation-number Nm. When the throttle opening degree $\theta_{TH}$ has been changed in the transient feed-back area, the amount of change in throttle opening degree is multiplied by the correcting factor KTH for correcting the return-time target speed ratio eTRN to increase or decrease it according to dTHTRN=$\theta_{TH}-\theta_{TH}0$.

A second term, KTH*KTRN*(|Nm−Nm0|) in the right side of the equation (4) is an additional term for further increasing the inclination of the right-raising of the basic term, wherein the addition factor KTRNn for increasing the eTRN is converted by the shift position P (particularly such that the increasing tendency is further strengthened in a fourth gear shift stage).

As described above, when the driver depresses or returns the accelerator pedal in the transient feed-back area, the second return-time target speed ratio eTRNm is changed in response to such operation, whereby the driver's intention is reflected to the driving force of the vehicle.

The transient feed-back area is finished when the return-time target speed ratio eTRN reaches the normal target speed ratio eECONOMY, when the actual speed ratio e reaches the normal target speed ratio eECONOMY, when the shift signal is input, and when the throttle opening degree $\theta_{TH}$ reaches a full-closed degree. The time point at such finish is shown by a time point $t_3$ in FIG. 4.

When the transient feed-back area is finished at the time point $t_3$, the normal feed-back control using the normal target speed ratio eECONOMY as a target value is carried out similarly as before the time point $t_0$ at which the transient feed-forward area is started.

When the target speed ratio eLCCMD at the normal time and at the transient time is determined in the above manner, the linear solenoid output calculating means M7 searches an output hydraulic pressure Qout from the linear solenoid LS from the table, based on such target speed ratio eLCCMD, and the linear solenoid output current calculating means M8 searches a linear solenoid output current ICMD output to the linear solenoid LS from the table, based on such output hydraulic pressure Qout. The opening degree of the linear solenoid LS is regulated by such linear solenoid output current ICMD, whereby the engage force of the lock-up clutch 4 of the torque converter 3, i.e., the actual speed ratio e of the torque converter 3 is controlled as described above.

Figure 8A:
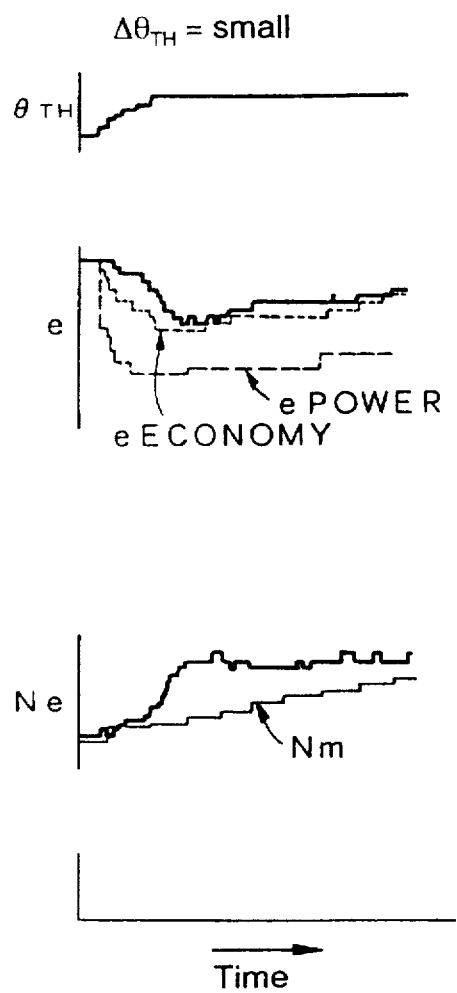
FIGS. 8A and 8B are graphs illustrating variations in parameters at the time when an accelerator pedal is depressed.
Figure 8B:
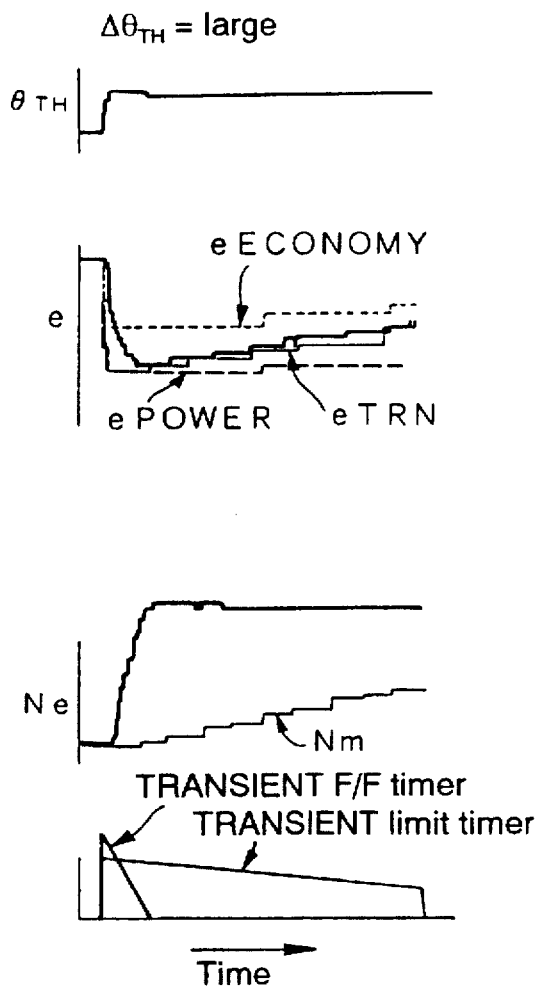

FIGS. 8A and 8B are graphs showing variations in parameters when the accelerator pedal is depressed during cruising of the vehicle at a speed of 55 km/hr using the fourth gear shift stage. In FIG. 8, 8B, with the indication entitled "during operation of transient control" there are shown the variations in parameters when the accelerator is depressed strongly, and FIG. 8A with the indications entitled "during non-operation of transient control" shows the variations in parameters when the accelerator is depressed weakly.

In FIG. 8B of "during operation of transient control", the driver's accelerating requirement with the accelerator pedal depressed strongly is reflected, whereby the actual speed ratio e is separated from the normal target speed ratio eECONOMY and follows the maximum driving-force speed ratio ePOWER. On the other hand, In FIG. 8A of "during non-operation of transient control", it is determined that the driver does not have the strong accelerating requirement, and the actual speed ratio e follows the normal target speed ratio eECONOMY without following the maximum driving-force speed ratio ePOWER.

Although the embodiment of the present invention has been described in detail, it will be understood that the present invention is not limited to the above-described embodiment, and various modifications may be made without departing from the subject matter and scope of the invention defined in claims.

What is claimed is:

1. A control device for a lockup clutch comprising:
control means for controlling an engage force of a lock-up clutch such that the actual speed ratio of a torque converter of an automatic transmission becomes equal to a predetermined target speed ratio corresponding to an operational state of a vehicle;
an engine load change rate detecting means for detecting a change rate of an engine load;
a maximum driving-force speed ratio calculating means for calculating a maximum driving-force speed ratio of the torque converter which provides a maximum driving force corresponding to the operational state of the vehicle; and a target speed ratio switching means for switching said predetermined target speed ratio to said maximum driving-force speed ratio when the change rate of the engine load becomes equal to or larger than a predetermined value.

2. A control device for a lockup clutch according to claim 1, further including a maximum driving-force speed ratio correcting means for correcting the maximum driving-force speed ratio, based on the change rate of engine load detected by said engine load change rate detecting means.

3. A control device for a lockup clutch comprising:

control means for controlling an engage force of a lock-up clutch such that the actual speed ratio of a torque converter of an automatic transmission becomes equal to a predetermined target speed ratio corresponding to an operational state of a vehicle:

an engine load change rate detecting means for detecting a change rate of an engine load;

a target speed ratio switching means for switching said predetermined target speed ratio to a during-acceleration target speed ratio when the change rate of the engine load becomes equal to or larger than a predetermined value; and a switching-control releasing means for releasing the control for switching said predetermined target speed ratio to said during-acceleration target speed ratio, when the actual speed ratio becomes a minimum value after said predetermined target speed ratio has been switched to said during-acceleration target speed ratio by the target speed ratio switching means.

4. A control device for a lockup clutch according to claim 3, wherein said switching-control releasing means is forcibly operated when said actual speed ratio does not reach said minimum value within a predetermined time after said predetermined target speed ratio has been switched to said during-acceleration target speed ratio by said target speed ratio switching means.

5. A control device for a lockup clutch according to claim 3, wherein a determination of whether said actual speed ratio reaches said minimum value after a lapse of a predetermined time is started after said predetermined target speed ratio has been switched to said during-acceleration target speed ratio by said target speed ratio switching means.

6. A control device for a lockup clutch according to claim 3, wherein as a return-time target speed ratio to be used for a time period from the operation of said switching-control releasing means to a lapse of a predetermined time, a first return-time target speed ratio which is gradually increased from said during-acceleration target speed ratio to said predetermined target speed ratio in proportion to the lapse of time is used.

7. A control device for a lockup clutch according to claim 3, wherein as a return-time target speed ratio to be used for a time period from the operation of said switching-control releasing means, a second return-time target speed ratio calculated based on the engine load and the number of rotations of a main shaft is used.

8. A control device for a lockup clutch according to claim 3, wherein as a return-time target speed ratio to be used for a time period from the operation of said switching-control releasing means to a lapse of a predetermined time, larger one of a first return-time target speed ratio which is gradually increased from said during-acceleration target speed ratio to said predetermined target speed ratio in proportion to the lapse of time, and a second return-time target speed ratio calculated based on the engine load and the number of rotations of a main shaft is used.

* * * * *